(12) United States Patent
Kataoka et al.

(10) Patent No.: US 10,887,324 B2
(45) Date of Patent: Jan. 5, 2021

(54) THREAT SCORING SYSTEM AND METHOD

(71) Applicant: NTT Innovation Institute, Inc.

(72) Inventors: Yasuyuki Kataoka, Palo Alto, CA (US); Douglas Junkins, Palo Alto, CA (US)

(73) Assignee: NTT RESEARCH, INC., East Palo Alto, CA (US)

( * ) Notice: Subject to any disclaimer, the term of this patent is extended or adjusted under 35 U.S.C. 154(b) by 0 days.

(21) Appl. No.: 15/709,008

(22) Filed: Sep. 19, 2017

(65) Prior Publication Data

US 2018/0083988 A1 Mar. 22, 2018

Related U.S. Application Data

(60) Provisional application No. 62/396,591, filed on Sep. 19, 2016.

(51) Int. Cl.
| | | |
|---|---|---|
| *H04L 29/06* | (2006.01) | |
| *G06N 99/00* | (2019.01) | |
| *G06F 21/57* | (2013.01) | |
| *G06F 21/55* | (2013.01) | |
| *G06N 20/00* | (2019.01) | |
| *G06N 5/00* | (2006.01) | |

(52) U.S. Cl.
CPC ........ *H04L 63/1416* (2013.01); *G06F 21/552* (2013.01); *G06F 21/577* (2013.01); *H04L 63/1491* (2013.01); *G06N 5/003* (2013.01); *G06N 20/00* (2019.01); *H04L 63/1425* (2013.01)

(58) Field of Classification Search
CPC ............ H04L 63/1416; H04L 63/1491; G06F 21/552; G06F 21/577
See application file for complete search history.

(56) References Cited

U.S. PATENT DOCUMENTS

| | | |
|---|---|---|
| 4,941,176 A | 7/1990 | Matyas et al. |
| 6,575,902 B1 | 6/2003 | Burton |
| 7,610,624 B1 | 10/2009 | Brothers et al. |
| 7,703,128 B2 | 4/2010 | Cross et al. |
| 7,912,698 B2 | 3/2011 | Statnikov et al. |
| 8,135,718 B1 | 3/2012 | Das et al. |
| 8,418,249 B1 | 4/2013 | Nuycci et al. |
| 8,621,203 B2 | 12/2013 | Ekberg et al. |
| 8,719,924 B1 | 5/2014 | Williamson et al. |

(Continued)

FOREIGN PATENT DOCUMENTS

| | | |
|---|---|---|
| CN | 104618377 A | 5/2015 |
| JP | 2008049602 A | 3/2018 |
| JP | 2018148267 A | 9/2018 |

OTHER PUBLICATIONS

H. Larochelle et al. "An empirical evaluation of deep architectures on problems with many factors of variation" ACM ICML '07, p. 473-480 (8 pgs).

(Continued)

*Primary Examiner* — Noura Zoubair

(57) ABSTRACT

A threat scoring system and method are provided in which the threat scoring system and method generates a better threat score. In one embodiment, the system and method may accept threat factors, accept weighting of the threat factors, generate a ground truth and generate a threat scoring using analytics based in part on the generated ground truth.

12 Claims, 8 Drawing Sheets

(56) References Cited

U.S. PATENT DOCUMENTS

| | | | |
|---|---|---|---|
| 8,726,379 B1 | 5/2014 | Stiansen et al. | |
| 8,762,298 B1 | 6/2014 | Ranjan et al. | |
| 8,806,647 B1 | 8/2014 | Daswani et al. | |
| 8,831,228 B1 | 9/2014 | Agrawal et al. | |
| 8,892,876 B1 | 11/2014 | Huang et al. | |
| 9,144,389 B2 | 9/2015 | Srinivasan et al. | |
| 9,183,387 B1 | 11/2015 | Altman et al. | |
| 9,258,321 B2 | 2/2016 | Amsler et al. | |
| 9,270,689 B1 | 2/2016 | Wang et al. | |
| 9,356,942 B1 | 5/2016 | Joffe | |
| 9,674,880 B1 | 6/2017 | Egner et al. | |
| 9,680,855 B2 | 6/2017 | Schultz et al. | |
| 9,716,728 B1 | 7/2017 | Tumulak | |
| 9,787,640 B1 | 10/2017 | Xie et al. | |
| 10,026,330 B2 | 7/2018 | Burford | |
| 10,038,723 B2 | 7/2018 | Gustafsson | |
| 10,140,381 B2 | 11/2018 | Trikha et al. | |
| 10,389,753 B2 | 8/2019 | Kawashima et al. | |
| 10,462,159 B2 | 10/2019 | Inoue et al. | |
| 10,566,084 B2 | 2/2020 | Kataoka | |
| 10,644,878 B2 | 5/2020 | Yamamoto | |
| 10,652,270 B1 | 5/2020 | Hu et al. | |
| 10,681,080 B1 | 6/2020 | Chen et al. | |
| 2002/0052858 A1 | 5/2002 | Goldman et al. | |
| 2002/0138492 A1 | 9/2002 | Kil | |
| 2003/0163686 A1 | 8/2003 | Ward et al. | |
| 2003/0169185 A1 | 9/2003 | Taylor | |
| 2003/0188181 A1 | 10/2003 | Kunitz et al. | |
| 2004/0015579 A1 | 1/2004 | Cooper et al. | |
| 2004/0022390 A1 | 2/2004 | McDonald et al. | |
| 2004/0128535 A1 | 7/2004 | Cheng | |
| 2004/0158350 A1 | 8/2004 | Ostergaard et al. | |
| 2004/0267413 A1 | 12/2004 | Keber | |
| 2006/0037080 A1 | 2/2006 | Maloof | |
| 2006/0038818 A1 | 2/2006 | Steele | |
| 2006/0187060 A1 | 8/2006 | Colby | |
| 2007/0136607 A1 | 6/2007 | Launchbury et al. | |
| 2007/0261112 A1 | 11/2007 | Todd et al. | |
| 2007/0266433 A1 | 11/2007 | Moore | |
| 2008/0098479 A1 | 4/2008 | O'Rourke et al. | |
| 2008/0119958 A1 | 5/2008 | Bear et al. | |
| 2008/0148398 A1 | 6/2008 | Mezack et al. | |
| 2008/0220740 A1 | 9/2008 | Shatzkamer et al. | |
| 2008/0276317 A1 | 11/2008 | Chandola et al. | |
| 2008/0279387 A1 | 11/2008 | Gassoway | |
| 2008/0294019 A1 | 11/2008 | Tran | |
| 2008/0307526 A1 | 12/2008 | Chung et al. | |
| 2008/0319591 A1 | 12/2008 | Markiton et al. | |
| 2009/0021394 A1 | 1/2009 | Coughlin | |
| 2009/0028141 A1 | 1/2009 | Vu Duong et al. | |
| 2009/0066521 A1 | 3/2009 | Atlas et al. | |
| 2009/0067923 A1 | 3/2009 | Whitford | |
| 2009/0077666 A1 | 3/2009 | Chen et al. | |
| 2009/0157057 A1 | 6/2009 | Ferren et al. | |
| 2009/0167531 A1 | 7/2009 | Ferguson | |
| 2009/0254973 A1 | 10/2009 | Kwan | |
| 2009/0254992 A1 | 10/2009 | Schultz et al. | |
| 2009/0287706 A1 | 11/2009 | Bourges-Waldegg et al. | |
| 2010/0007489 A1* | 1/2010 | Misra | G06Q 10/00 340/540 |
| 2010/0183211 A1 | 7/2010 | Meetz et al. | |
| 2010/0201489 A1 | 8/2010 | Griffin | |
| 2010/0246827 A1 | 9/2010 | Lauter et al. | |
| 2010/0286572 A1 | 11/2010 | Moersdorf et al. | |
| 2011/0179492 A1 | 7/2011 | Markopoulou et al. | |
| 2011/0291803 A1 | 12/2011 | Bajic et al. | |
| 2011/0299420 A1 | 12/2011 | Waggener et al. | |
| 2012/0005755 A1 | 1/2012 | Kitazawa et al. | |
| 2012/0110328 A1 | 5/2012 | Pate et al. | |
| 2012/0167210 A1 | 6/2012 | Garcia et al. | |
| 2012/0278889 A1 | 11/2012 | El-Moussa | |
| 2012/0324568 A1 | 12/2012 | Wyatt et al. | |
| 2013/0046696 A1 | 2/2013 | Radhakrishnan | |
| 2013/0046987 A1 | 2/2013 | Radhakrishnan | |
| 2013/0074186 A1 | 3/2013 | Muttik | |
| 2013/0104238 A1 | 4/2013 | Balson et al. | |
| 2013/0111036 A1 | 5/2013 | Ozawa et al. | |
| 2013/0247205 A1 | 9/2013 | Schrecker et al. | |
| 2013/0298243 A1 | 11/2013 | Kumar et al. | |
| 2013/0347094 A1 | 12/2013 | Bettini et al. | |
| 2014/0105573 A1* | 4/2014 | Hanckmann | G06K 9/00718 386/241 |
| 2014/0108474 A1 | 4/2014 | David et al. | |
| 2014/0115707 A1* | 4/2014 | Bailey, Jr. | H04L 63/0861 726/25 |
| 2014/0122370 A1 | 5/2014 | Jamal et al. | |
| 2014/0136846 A1 | 5/2014 | Kitze et al. | |
| 2014/0137257 A1 | 5/2014 | Martinez et al. | |
| 2014/0153478 A1 | 6/2014 | Kazmi et al. | |
| 2014/0157405 A1 | 6/2014 | Joll et al. | |
| 2014/0163640 A1 | 6/2014 | Edgerton et al. | |
| 2014/0181267 A1 | 6/2014 | Watdkins et al. | |
| 2014/0181973 A1 | 6/2014 | Lee et al. | |
| 2014/0189861 A1 | 7/2014 | Gupta et al. | |
| 2014/0189873 A1 | 7/2014 | Elder et al. | |
| 2014/0201374 A1 | 7/2014 | Ashwood-Smith | |
| 2014/0201836 A1 | 7/2014 | Amsler | |
| 2014/0219096 A1 | 8/2014 | Rabie et al. | |
| 2014/0222813 A1 | 8/2014 | Yang et al. | |
| 2014/0229739 A1 | 8/2014 | Roth et al. | |
| 2014/0237599 A1 | 8/2014 | Gertner et al. | |
| 2014/0259170 A1* | 9/2014 | Amsler | H04L 63/20 726/23 |
| 2014/0317261 A1 | 10/2014 | Shatzkamer et al. | |
| 2014/0317293 A1 | 10/2014 | Shatzkamer | |
| 2014/0325231 A1 | 10/2014 | Hook et al. | |
| 2015/0019710 A1 | 1/2015 | Shaashua et al. | |
| 2015/0033340 A1 | 1/2015 | Giokas | |
| 2015/0061867 A1 | 3/2015 | Engelhard et al. | |
| 2015/0074807 A1 | 3/2015 | Turbin | |
| 2015/0082308 A1 | 3/2015 | Kiess et al. | |
| 2015/0088791 A1 | 3/2015 | Lin et al. | |
| 2015/0096024 A1 | 4/2015 | Haq et al. | |
| 2015/0163242 A1 | 6/2015 | Laidlaw et al. | |
| 2015/0227964 A1 | 8/2015 | Yan et al. | |
| 2015/0283036 A1 | 10/2015 | Aggarwal et al. | |
| 2015/0288541 A1 | 10/2015 | Farango et al. | |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0326587 A1 | 11/2015 | Vissamsetty et al. | |
| 2015/0326588 A1 | 11/2015 | Vissamsetty et al. | |
| 2015/0333979 A1 | 11/2015 | Schwengler et al. | |
| 2015/0356451 A1 | 12/2015 | Gupta et al. | |
| 2015/0381423 A1 | 12/2015 | Xiang | |
| 2015/0381649 A1 | 12/2015 | Schultz et al. | |
| 2016/0006642 A1 | 1/2016 | Chang et al. | |
| 2016/0014147 A1 | 1/2016 | Zoldi et al. | |
| 2016/0050161 A1 | 2/2016 | Da et al. | |
| 2016/0057234 A1 | 2/2016 | Parikh et al. | |
| 2016/0065596 A1 | 3/2016 | Baliga et al. | |
| 2016/0154960 A1 | 6/2016 | Sharma et al. | |
| 2016/0156644 A1 | 6/2016 | Wang et al. | |
| 2016/0156656 A1* | 6/2016 | Boggs | H04L 63/1433 726/25 |
| 2016/0182379 A1 | 6/2016 | Mehra et al. | |
| 2016/0205106 A1 | 7/2016 | Yacoub et al. | |
| 2016/0248805 A1* | 8/2016 | Burns | H04L 63/1433 |
| 2016/0301704 A1 | 10/2016 | Hassanzadeh et al. | |
| 2016/0301709 A1 | 10/2016 | Hassanzadeh et al. | |
| 2016/0344587 A1 | 11/2016 | Hoffmann | |
| 2016/0352732 A1 | 12/2016 | Bamasag et al. | |
| 2016/0364553 A1 | 12/2016 | Smith et al. | |
| 2017/0063893 A1 | 3/2017 | Franc et al. | |
| 2017/0093915 A1 | 3/2017 | Ellis et al. | |
| 2017/0149804 A1 | 5/2017 | Kolbitsch et al. | |
| 2017/0228651 A1 | 8/2017 | Yamamoto | |
| 2017/0264597 A1 | 9/2017 | Pizot et al. | |
| 2017/0310485 A1 | 10/2017 | Robbins et al. | |
| 2017/0318033 A1 | 11/2017 | Holland et al. | |
| 2017/0366571 A1 | 12/2017 | Boyer | |
| 2017/0373835 A1 | 12/2017 | Yamamoto | |
| 2017/0374084 A1 | 12/2017 | Inoue et al. | |
| 2018/0212768 A1 | 7/2018 | Kawashima et al. | |

(56) References Cited

U.S. PATENT DOCUMENTS

| | | | |
|---|---|---|---|
| 2018/0212941 A1 | 7/2018 | Yamamoto et al. |
| 2018/0337958 A1 | 11/2018 | Nagarkar |
| 2019/0052652 A1 | 2/2019 | Takahashi et al. |
| 2019/0075455 A1 | 3/2019 | Coulier |
| 2019/0156934 A1 | 5/2019 | Kataoka |
| 2019/0370384 A1 | 12/2019 | Dalek et al. |

OTHER PUBLICATIONS

J. Bergstra et al. "Random Search for Hyper-Parameter Optimization" Journal of Machine Learning Research 13 (2012), p. 281-305 (25 pgs).
Wikipedia—anonymous—https://en.wikipedia.org/wiki/Decision_tree (5 pgs).
Wikipedia—anonymous—https://en.wikipedia.org/wiki/Support_vector_machine(16 pgs).
Wikipedia—anonymous—https://en.wikipedia.org/wiki/K-nearest_neighbors_algorithm (11 pgs).
Wikipedia—anonymous—https://en.wikipedia.org/wiki/Gradient_boosting (8 pgs).
Wikipedia—anonymous—https://en.wikipedia.org/wiki/Naive_Bayes_classifier (10 pgs).
Wikipedia—anonymous—https://en.wikipedia.org/wiki/Bootstrap_aggregating (3 pgs).
Wikipedia—anonymous—https://en.wikipedia.org/wiki/Logistic_regression (14 pgs).
Wikipedia—anonymous—https://en.wikipedia.org/wiki/AdaBoost (12 pgs).
Kaggle—https://www.kaggle.com/wiki/Home (2 pgs.).
Wikipedia—anonymous—TLS: Transport Layer Security Protoco—Webpage https://en.wikipedia.org/wiki/Transport_Layer_security (1 pgs/).
NIST—National Insitute of Standards and Techology, US Department of Commerce "Computer Security Resource Center" AES Algorithm With Galois Counter Mode of Operation. Webpage https://csrc.nist.gov/projects/block-cipher-techniques/bcm (3 pgs.).
Moriarty, et al. PKI Certificate—PKCS #12: Personal Information Exchange Syntax v1.1—Webpage https://tools.ietf.org/html/rfc7292 (30 pgs).
ITU—International Telecommunication Union—Open Systems Interconnection—X.509: Information Technology—Public-key and attribute framework certificate—Webpage http://www.itu.int/rec/T-REC-X.509/enn (2 pgs.).
Groves, M., Sakai-Kasahara Key Encryption (SAKKE)—Internet Engineering Task Force dated Feb. 2012—Webpage https://tools.ietf.org/html/rfc6508 (22 pgs.).
Barbosa, L. et al.—SK-KEM: An Identity-Based Kem, Algorithm standardized in IEEE—Webpage http://grouper.ieee.org/groups/1363/IBC/submissions/Barbosa-SK-KEM-2006-06.pdf (20 pgs.).
Boyen-X, et al—Identity-Based Cryptography Standard (IBCS) #1: Supersingular Curve Implementations of the BF and BB1 Cryptosystems, dated Dec. 2007—Webpage https://tools.ietf.org/html/rfc5091 (64 pgs.).
An Amazon.com company @ Alexa—Webpage: https://www.alexa.com/siteinfo (5 pgs.).
Stouffer, K. et al.—"The National Institute of Standards & Technology(NIST) Industrial Control System (ICS) security guide" dated May 2015 (247 pgs.).
Auto-WEKA webpage printed Feb. 17, 2015 (2 pages).
Ayat, N.E.; Cheriet, M.; Suen, C.Y.; "Automatic Model Selection for the optimization of SVM Kernels," Mar. 21, 2005 (35 pages).
Brodley, Carla E., "Addressing the Selective Superiority Problem: Automatic Algorithm/Model Class Selection," (1993) (8 pages).
Chapelle, Olivier; Vapnik, Vladimir; Bousquet, Olivier; Mukherjee, Sayan; "Choosing Multiple Parameters for Support Vector Machines," Machine Learning, 46, 131-159, 2002 © 2002 Kluwer Academic Publishers. Manufactured in the Netherlands.
Lee, Jen-Hao and Lin, Chih-Jen, "Automatic Model Selection for Support Vector Machines," (2000).
Smith, Michael R.; Mitchell, Logan; Giraud-Carrier, Christophe; Martinez, Tony; "Recommending Learning Algorithms and Their Associated Hyperparameters," Jul. 7, 2014 (2 pages).
Thornton, Chris. Thesis: "Auto-WEKA: Combined Selection and Hyperparameter Optimization of Supervised Maching Learning Algorithms," Submitted to the University of British Columbia, Mar. 2014 (75 pages).
Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).
Wolinski, Christophe; Kuchcinski, Krzysztof. "Automatic Selection of Application-Specific Reconfigurable Processor Extensions." Design, Automation & Test in Europe Conference (Date '08), Mar. 2008, Munich, Germany, pp. 1214-1219 (7 pages).
Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).
Chih-Fong, T. et al. Intrusion Detection by Machine Learning: A Review: dated 2009; pp. 11994-12000 (7 pages.).
Soldo, Fabio, Anh Le, and Athina Markopoulou. "Predictive blacklisting as an implicit recommendation system." INFOCOM, 2010 Proceedings IEEE. IEEE, 2010. (Year: 2010), 9 pages.
Kataoka et al. Mining Muscle Use Data for Fatigue Reduction in IndyCar. MIT Sloan Sports Analytics Conference. Mar. 4, 2017 [retrieved Oct. 9, 2018]. Retrieved from the Internet, entire document http://www.sloansportconference.com/wp-content/uploads/2017/02/1622.pdf.
Kegelman, J.C., et al., "Insights into vehicle trajectories at the handling limits: analyzing open data from race car drivers; Taylor & Francis, Vehicle System Dynamics" dated Nov. 3, 2016 (18 pgs.).
Theodosis, P. et al., "Nonlinear Optimization of a Racing Line for an Autonomous Racecar Using Professional Driving Techniques", dated Oct. 2012, 7 pages, Citation and abstract, retrieved from the web at: https://www.researchgate.net/publication/267650184.
Tulabandhula, T. et al. "Tire Changes, Fresh Air, and Yellow Flags: Challenges in Predictive Analytics for Professional Racing" MIT, dated Jun. 2014 (16 pages.).
Takagahara, K. et al.: "hitoe"—A Wearable Sensor Developed through Cross-industrial Collaboration, NTT Technical Review, dated Sep. 4, 2014 (5 pages.).
Lee, J.H., et al., "Development of a Novel Tympanic Temperature Monitoring System for GT Car Racing Athletes," World Congress on Medical Physics and Biomedical Engineering, May 26-31, 2012, Beijing, China, Abstract Only, pp. 2062-2065, dated 2013, (3 pages.)—retrieved from the web at: https://link.springer.com/chapter/10.1007/978-3-642-29305-4_541.
NTT Innovation Institute, Inc., Global Cyber Threat Intelligence by Kenji Takahashi, Aug. 6, 2016, retrieved on Aug. 16, 2017, retrieved from the Internet, entire document https://www.slideshare.net/ntti3/global-cyber-threat-intelligence.
How to handle Imbalanced Classification Problems in machine learning?In: Analytics Vidhya. Mar. 17, 2017 (Mar. 17, 2017) Retrieved on Aug. 2, 2019 (Aug. 2, 2019), entire document https://www.analyticsvidhya.com/blog/2017/03/imbalanced-classification-problems/.
Yen et al. "Cluster-based under-sampling approaches for imbalanced data distributions." In: Expert Systems with Applications. Apr. 2009 (Apr. 2009) Retrieved on Aug. 2, 2019 (Aug. 2, 2019), entire document http://citeseemist.psu.edu/viewdoc/download?doi=10.1.1.454.35308.rep=rep1&type=pdf.
Chawla et al. "SMOTE: synthetic minority over-sampling technique." In: Journal of artificial intelligence research. Jun. 2, 2002 (Jun. 2, 2002) Retrieved on Aug. 2, 2019 (Aug. 2, 2019), entire document https://www.jairorg/index.php/jaidarticle/download/10302J24590.
Malik et al. "Automatic training data cleaning for text classification." In: 2011 IEEE 11th international conference on data mining workshops. Dec. 11, 2011 (Dec. 11, 2011) Retrieved on Aug. 2, 2019 (Aug. 2, 2019), entire document http://wwwl.cs.columbia.edu/-hhm2104/papers/atdc.pdf.

* cited by examiner

| CRD: CUSTOMER-ORIENTED FLEXIBLE ML TOOLS | SEARCH... | DASHBOARD SETTINGS PROFILE HELP |

| OVERVIEW |
| STEP1 FACTORS |
| STEP2 WEIGHTS |
| STEP3 ANALYTICS |

STEP2
PLEASE CHOOSE THE WEIGHT IN COMPARISON TO THE 2 FACTORS

THE DIVERSITY OF ATTACKS    VS    THE DIVERSITY OF SENSORS
| 10 | 9 | 8 | 7 | 6 | 5 | 4 | 3 | 2 | 1 | 0 | 1 | 2 | 3 | 4 | 5 | 6 | 7 | 8 | 9 | 10 |

THE DIVERSITY OF SENSORS    VS    DIMENSION DATA ANNOTATION
| 10 | 9 | 8 | 7 | 6 | 5 | 4 | 3 | 2 | 1 | 0 | 1 | 2 | 3 | 4 | 5 | 6 | 7 | 8 | 9 | 10 |

DIMENSION DATA ANNOTATION    VS    THE DIVERSITY OF ATTACKS
| 10 | 9 | 8 | 7 | 6 | 5 | 4 | 3 | 2 | 1 | 0 | 1 | 2 | 3 | 4 | 5 | 6 | 7 | 8 | 9 | 10 |

( ◄ BACK )                                                                 ( NEXT ► )

FIGURE 6

THREAT SCORING SYSTEM AND METHOD

PRIORITY CLAIM/RELATED APPLICATIONS

This application claims priority under 35 USC 120 and the benefit under 35 USC 119(e) to U.S. Provisional Patent Application Ser. No. 62/396,591, filed Sep. 19, 2016 and entitled "Threat Scoring System and Method", the entirety of which is incorporated herein by reference.

FIELD

The disclosure relates generally to a system and method for threat scoring and in particular to a system and method for cyber threat scoring.

BACKGROUND

A threat is an attack against a computer network, computer, server and the like (collectively each a "computing device"). The threat is typically carried out in an attempt to gain access to the computing device, steal information/data stored and managed by the computing device or disable the computing device. For each threat, the information about the threat has many attributes such as Attack Source, Destination Source, Location, Time Stamp, and so on. Threat scoring or prioritization adds a threat score to each one of these attributes.

Threat scoring allows security professionals to prioritize the data stream and create mechanisms for dealing with cyber threats. For example, security professionals can create policies that block access to information if the score level is above a certain threshold. Threat scoring has the following challenges:

No universal around truth

Machine learning software can be used to analyze cyber threat data labeled by security professionals and generate models that can be used to score threats in unlabeled data. The labeled data, with threat scores ranging from 0.0 to 1.0 in this case, is referred to as the ground truth. Analyzing the ground truth generated by security professionals allows the machine-learning software to mimic the logic they used to label the data, which results in more accurate threat scores than ground truth generated by non-experts. The challenge is that the accuracy of the ground truth depends who labels the threat data. Even security professionals can differ in how they label the data. Currently, there is no consensus on how best to determine the ground truth for threat scoring.

Reliability as opposed to data processing throughput

There are several factors that determine the threat score such as the number of attacks, diversity of attacks, a company's reliable threat information, and factors discovered by other threat analysis tools. Each factor has a different reliability score. For example, one of the analysis tools, DSAP, is known for highly reliable analytical tools, but it takes DSAP 5 minutes on average to thoroughly analyze malware. Thus, reliability comes at the expense of data processing throughput. Using highly reliable methods for threat detection results in smaller datasets, which adversely impacts the results of machine-learning analysis of the data.

Unique ID problem

Usually, threat information is associated with a source IP address or URL. However, some attackers cleverly change the IP address or URL to avoid detection. In this case, even if threat scoring were successful, if an attacker changes the IP address after a few hours, the analyzed data would be of no use.

Threat scoring has various general benefits including time and efficiency gains within SOCs and managed security service providers (MSSPs) and a reduction in the risk of failure to detect and mitigate threats. Security professionals might not be able to check all of the threats if they are not scored, but with scoring, the professionals will have a much smaller numbers of threats to check, which increases the chances of these threats being acted upon.

Thus, it is desirable to provide a novel threat scoring system and method and it is to this end that the disclosure is directed.

BRIEF DESCRIPTION OF THE DRAWINGS

FIG. 6 illustrates an example of a user interface for assigning weights to selected factors that is part of the threat scoring method;

DETAILED DESCRIPTION OF ONE OR MORE EMBODIMENTS

The disclosure is particularly applicable to a threat scoring system for cyber-threats and it is in this context that the disclosure will be described. It will be appreciated, however, that the system and method has greater utility since the system may be used to score different types of threats and may also be implemented in other manners.

Figure 1:
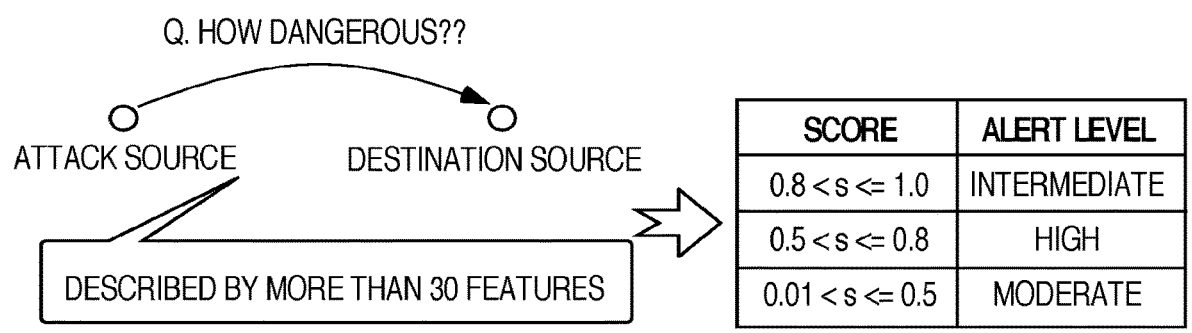
FIG. 1 illustrates an example of threat scoring.

FIG. 1 illustrates an example of threat scoring that may be the result of a threat scoring system and method described below. A threat is generally an attack against a computer network, computer, server and the like (collectively each a "computing device") by an attack source (a person, entity, etc.) who is trying to illegally gain access to destination source (the computing device), illegally extract information/data from the computing device and/or prevent the computing device from functioning properly. A threat score is an assessment of how dangerous the threat is to the computing device and that score may be based on more than thirty different features. FIG. 1 also shows an example of the threat scoring in which different threat scores are assigned different levels of threat ranging from immediate to high to moderate. The resultant threat score may be used by IT personnel of an entity or other security people. For example, the threat score may be used to prioritize resources to the immediate threats as well as other uses.

Figure 2:
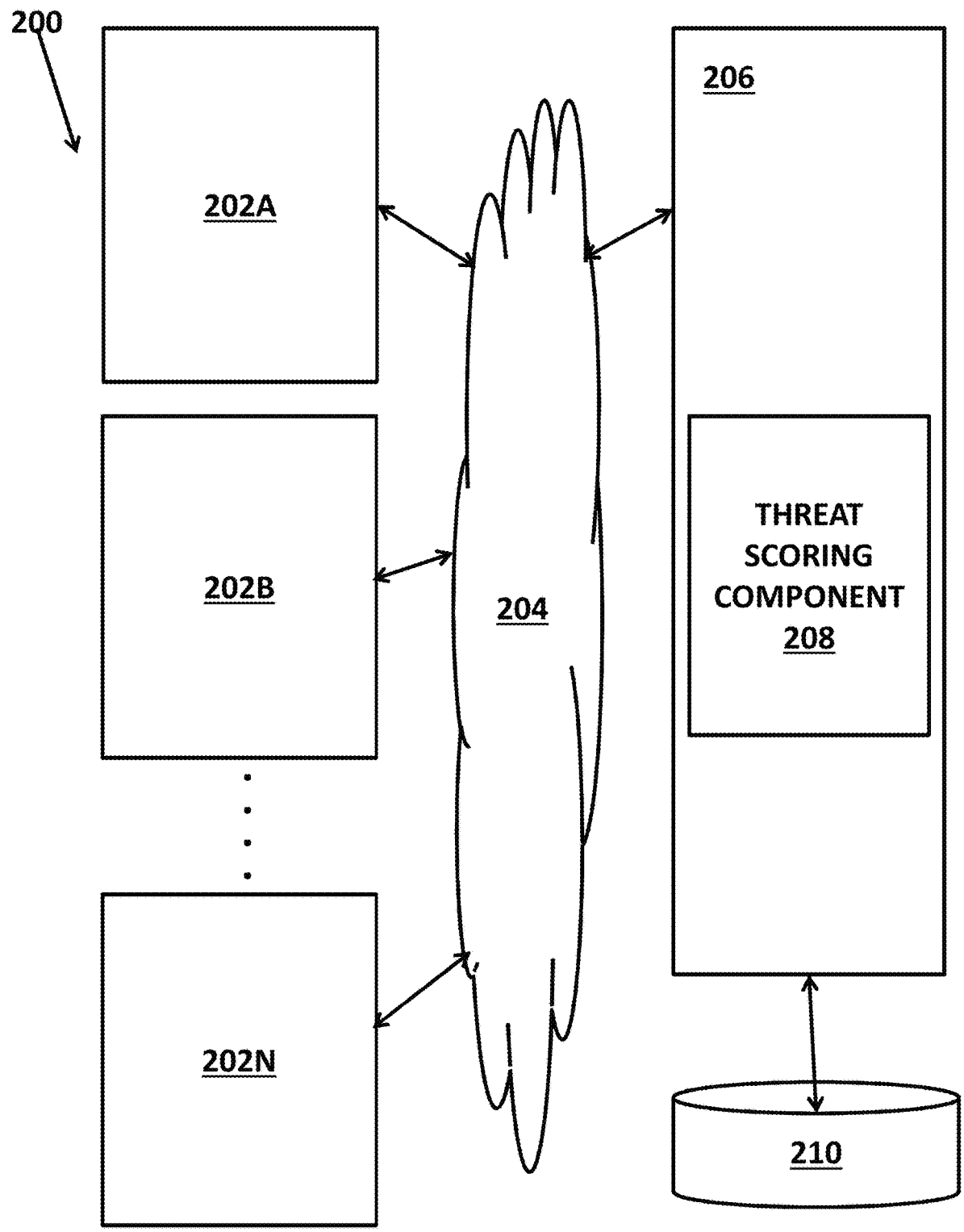
FIG. 2 illustrates an example of an implementation of a threat scoring system.

FIG. 2 illustrates an example of an implementation of a threat scoring system 200 that may be used for determining a threat score and display the results of the threat score. In this implementation, a client/server type computer architecture is being used. However, the threat scoring system may also be implemented using a cloud based architecture, using a standalone computer, using a mainframe computer system and the like since the threat scoring system is not limited to any particular computer architecture.

The system 200 may have one or more computing devices 202 (part of a frontend), such as computing devices 202A, 202B, . . . , 202N as shown in FIG. 2, that may connect to and interact with a backend system 206 over a communications path 204. Each computing device 202 may be used to display user interfaces of the system (examples of which are shown in FIGS. 4-9), receive data from the backend system 206, input data to the backend system, such as by filling in forms or interacting with web pages in the client server implementation shown and receive results from the backend system 206 such as using a web page with HTML code that may be displayed in a browser. Each computing device 202 may be processor based device with one or more processors, memory, such as SRAM or DRAM, persistent storage, such as flash memory or a hard disk drive, a display and communications circuitry. For example, each computing device 202 may be a smartphone device, such as an Apple iPhone or Android OS-based device, a computer system, a laptop computer, a tablet computer, a terminal and the like. In the implementation shown in FIG. 2, each computing device 202 may have a browser application that is executed by the processor to interact with the backend system 206. In other embodiments, each computing device 202 may have mobile application or an application downloaded to the computing device that allows the user of the computing device to connect to and interact with the backend system 206.

The communication path 204 may be a wired communication link, a wireless communication link or a combination of both wired and wireless communications links that allow each computing device to connect to the backend system 206 and exchange data with the backend system using various communication and data protocols. For example, in the implementation shown in FIG. 2, the communications protocol may be TCP/IP and the data transfer protocol may be HTTP or HTTPS and use HTML code for communicating the data. For example, the communication path 204 may be one or more of an Ethernet network, a cable network, a WiFi network, a cellular digital data network, a digital data network, a digital computer network and the like.

The backend 206 may be implemented using one or more computing resources, such as server computers, mainframe computers, blade servers, processors, storage devices and the like. In one implementation, the backend 206 may have at least one processor that may execute a threat scoring component 208 (that has a plurality of lines of instructions/computer code) to implement the threat scoring method described below. In other implementations, the threat scoring component 208 may be a piece of hardware (integrated circuit, microcontroller, logic device, etc.) that implement the threat scoring method described below.

The system 200 may also have storage 210 that is accessible by the threat scoring component 208 and the data may be used by the system to perform the threat scoring method as described below. The storage 210 may store, for example, user data, various types of threat data and threat data factors as described below and various other types of data.

Figure 3:
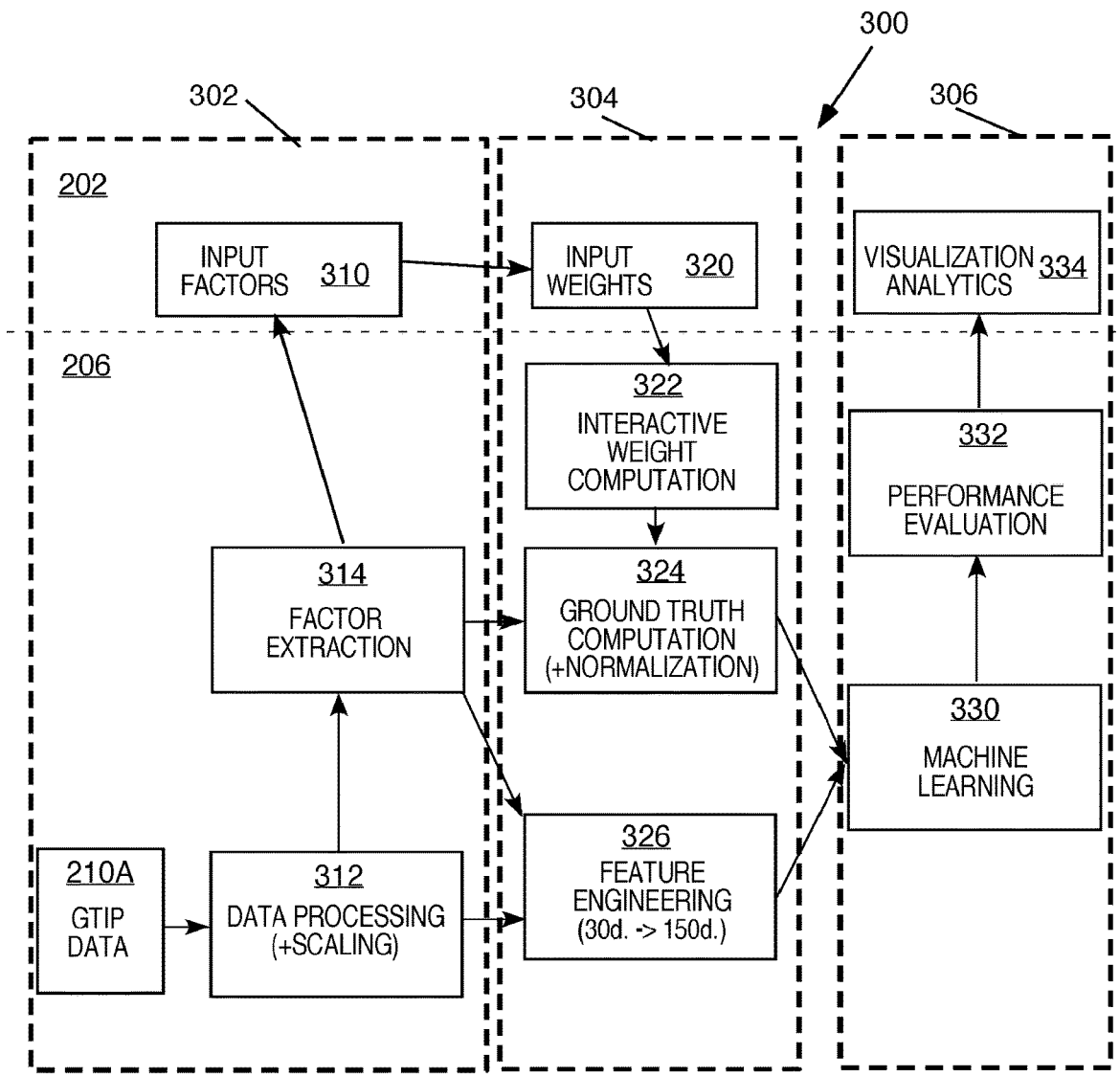
FIG. 3 illustrates more details of the threat scoring system and method.
Figure 4:
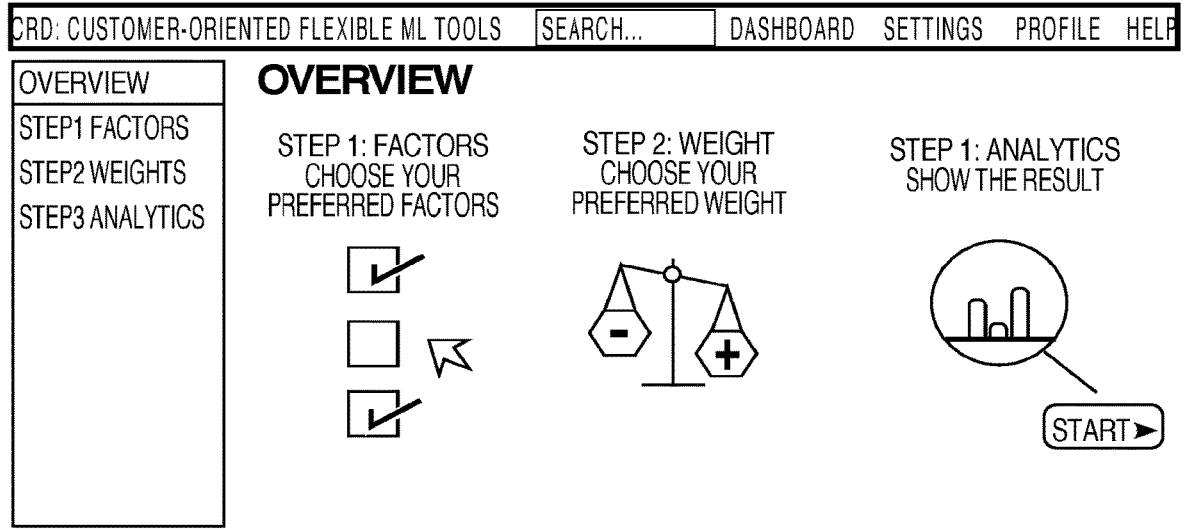
FIG. 4 illustrates an example of an initial user interface of the threat scoring system.

FIG. 3 illustrates more details of the threat scoring system and method 300 that may be implemented, for example, using the system 200 shown in FIG. 2. As shown in FIG. 3, the method may be carried out using the computing device(s) 202 in the front end and the backend system 206. The method may include a process 302 for selecting threat factors, a process 304 for assigning weights to the selected factors and a process 306 for determining the threat scoring and performance evaluation. The processes 302, 304 compute the ground truth that is then used to generate a more accurate threat score based on the selected factors. FIG. 4 illustrates an example of an initial user interface of the threat scoring system that may show the user an overview of the processes to determine the threat score.

Selecting Threat Factors 302

Figure 5:
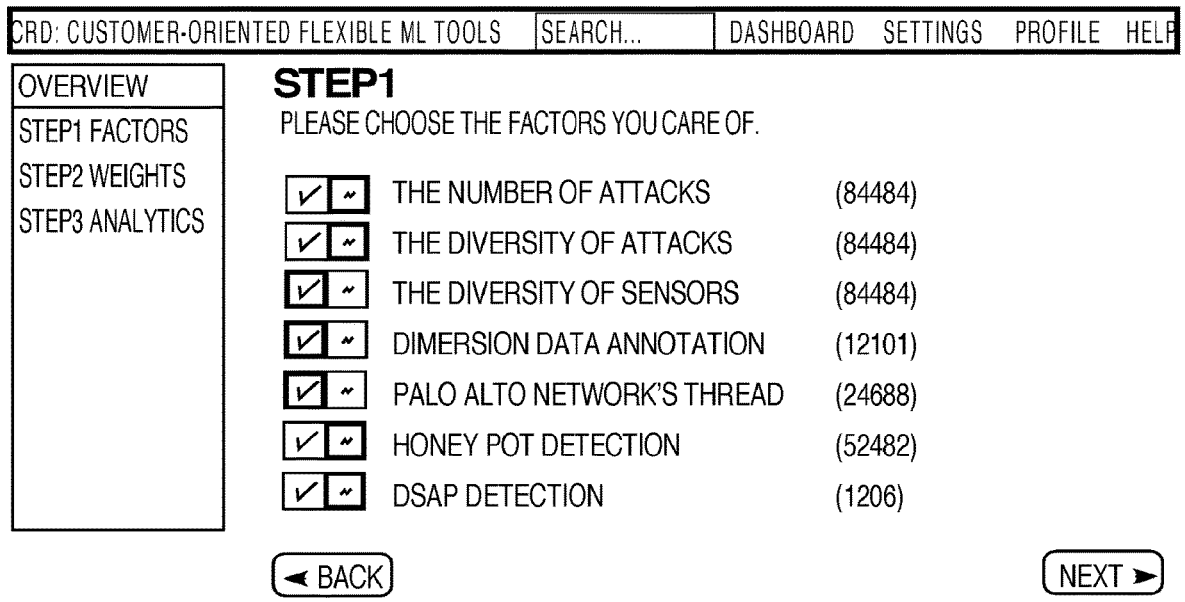
FIG. 5 illustrates an example of a user interface for selecting threat factors that is part of the threat scoring method.

During this process 302, one or more threat factors may be selected/inputted into the system (310). In one example, a user may enter the one or more threat factors into the system using a user interface. An example of a user interface for entering the threat factors is shown in FIG. 5. In the example in FIG. 5, the threat factors that may be selected by the user may include, for example, a number of attacks, a diversity of the attacks, a diversity of the sensors, dimension data annotation, Palo Alto Network's Thread, honey pot detection and DSAP detection. A number of attacks is the count of one IP address which is shown in the original source in the threat information. A diversity of the attacks is the number of the unique destination sources that one original IP address is attacking. A diversity of the sensors is the number of the unique sensors that captured one original IP address as the threat information. Dimension data annotation and Palo Alto Network's Threat are the examples of attack information that is captured by other security companies, which could be either manually or automatically. Honey pot detection and DSAP are the examples of threat analysis tools that capture the threat information. In one embodiment, the threat factors that may be displayed to the user for selection may be generated based on (extracted from the) threat data 210A that may be stored by the storage 210 of the system. The threat data may be original data based on input from security professionals, which is taken into account in the design of the system. The threat factors may be extracted using a data pre-processor 312 and a factor extractor 314. The data pre-processor may process and normalize the threat data and the scores for each factor extracted from the threat data may be scaled as described below.

The following is an example of original data from which the system may extracts factors.

| | |
|---|---|
| Header | objectId,timestampReceived,attackSource,originalScore,calculatedScore,category, killChain,timestampIdentified,identifiedBy,expirationDate,count,analystComment, validationMechanism,releaseLimits,organizationId,attackDestination, sourceLatitude,sourceLongitude,destinationLatitude,destinationLongitude, sourceCountryCode,sourceCity,destinationCountryCode,destinationCity,sensorTYpe, sensorId,attackDetailsId,dataSource,groups,modificationtimestamp,attackmetadata |
| Data 1 | VjpVDFY6V4EARuaFtkLOzwE,1446664065,shadu.baidu.com,0,0,3,0,1446663436, malwareAnalysisResult@ntti3.com,1447268236,1,[ ],1,255,1,,39.9289, 116.3883,,,CN,Beijing,,,,,,7,[ ],1446664065,"{""timestamp"":""2015-11-04 18:57:16"",""port"":""80"",""md5"":""7f4e8c9ae48a2d7e8264306885765708"", ""domain"":""shadu.baidu.com"",""ip"":""123.125.65.162""}" |

-continued

Data 2 : VjoXu65EVTg8ZBP2jWJPgwA,1446651442,1.55.195.192,0,0,0,0,1446647739,
tpfc@ntti3.com,1447252539,1,[ ],0,63,1,,21.0333,105.85,,,VN,Hanoi,,,
TPFC,uceprotect:level1,AAAABgAAA0JWOiVoAAAAIQ==,4,[ ],1446651442,
"{""journal"":""true"",""download_url"":""http://wget-
mirrors.uceprotect.net/rbldnsd-all/dnsbl-
1.uceprotect.net.gz"",""download_time"":""2015-11-04T14:35:39Z"",
""ver"":""v1.0.1""}"

Based on the above example threat data, the system may extract factors from the threat data. From the example data above, the system may extract seven factors, although the system can also extract fewer or more factors depending on the data and what security professionals think is appropriate for the customer. Based on the example data above, the system may extract the following 7 factor candidates.

$f_1$: The number of attacks
$f_2$: The diversity of attacks
$f_3$: The diversity of sensors
$f_4$: Dimension Data Annotation
$f_5$: Palo Alto Network's Thread
$f_6$: Honey Pot detection
$f_7$: DSAP detection An example of an interface that displays the extracted factors from which a user may select the threat factors is shown in FIG. 5. In the user interface, the user may select one or more of the extracted factors. In the user interface, an account size of the data for each extracted factor is shown in parentheses. Thus, when selecting factors, customers need to take into account size of the data since smaller data samples (such as the DSAP detection factor shown in FIG. 5) result in less accuracy (decreased performance).

The system scales the scores for these factors so that the scores are between 0 and 1 ($0 <= f* <= 1$).

Assigning Weights to Selected Factors (304)

In this process 304, a weight of each selected factor may be assigned (process 320) using the frontend (one of the computing devices 202). In one embodiment, a user may use a user interface (an example of which is shown in FIG. 6) to assign a weight to each selected factor. Because it is not easy to assign the weights, the system provides the user with a simple way for specifying the weight by allowing the user to specify the importance of a factor relative to another factor, as shown in FIG. 6.

In the example shown in FIG. 6, the user tells the system that The diversity of score factor is 5 times more important than The diversity of attacks factor. The diversity of sensors factor is 3 time more important than the Dimension Data Annotation factor, and The diversity of attacks factor is 7 times more important the Dimension Data Annotation factor. Note that the relative importance weighting scale is adjustable. Thus, for another dataset, selecting a relative importance factor of 5 can indicate that one factor is 1.5 times more important than another factor.

In the process 304, the process may include an interactive weight computation 322, a ground truth computation 324 (and normalization) and feature engineering 326 based on the selected factors, the extracted factors from the factor extractor 314 and the pre-processed and scaled threat data and threat score data.

During the interactive weigh computation (322), based on the factor selection, the customer is presented with $_nC_2$ combination patterns. The system may use the customer selection above to calculate the weight between factors a and b ($w_{ab}$). Then, the n-by-n reciprocal matrix is:

$$A = \begin{bmatrix} 1 & w_{12} & w_{13} & \ldots & w_{1n} \\ \frac{1}{w_{12}} & 1 & w_{23} & \ldots & w_{2n} \\ \ldots & \ldots & \ldots & \ldots & \ldots \\ \ldots & \ldots & \ldots & \ldots & \ldots \\ \frac{1}{w_{1n}} & \frac{1}{w_{2n}} & \ldots & \ldots & 1 \end{bmatrix}$$

For example, according to the selections in the example in FIG. 5, the system may generate the following values.

$$f_1 vs f_2 = 5$$
$$f_2 vs f_3 = \frac{1}{2}$$
$$f_3 vs f_1 = 7$$

This results in the following:

$$A = \begin{bmatrix} 1 & 5 & \frac{1}{7} \\ \frac{1}{5} & 1 & \frac{1}{3} \\ 7 & 3 & 1 \end{bmatrix}$$

For the overall weight computation, it is known that the $1^{st}$ Eigenvector of W corresponds to the overall weight, as shown in the following formula:

$$EigVec(A) = W = [w_{1*}, w_{2*}, w_{3*}]$$

In this formula, $w_{1*}$ represents the overall weight.

To compute the normalized weight $w_1$, the system uses the following formula:

$$w_1 = \frac{w_{1*}}{\sum w_{1*}}$$

In the above case, $w_{1*} = [-0.305, -0.138, -0.942]^T$ and $w\_1 = [0.220, 0.100, 0.680]^T$.

Using the normalized weight, the ground truth process 324 proceeds to compute the ground truth as follows, $f_k$ where represents the $k^{th}$ factor:

$$f = [f_1, f_2, \ldots f_k, \ldots f_n]$$

$$score = f \times w_1 ([1 \times n] \times [n \times 1] = scalar)$$

Figure 7:
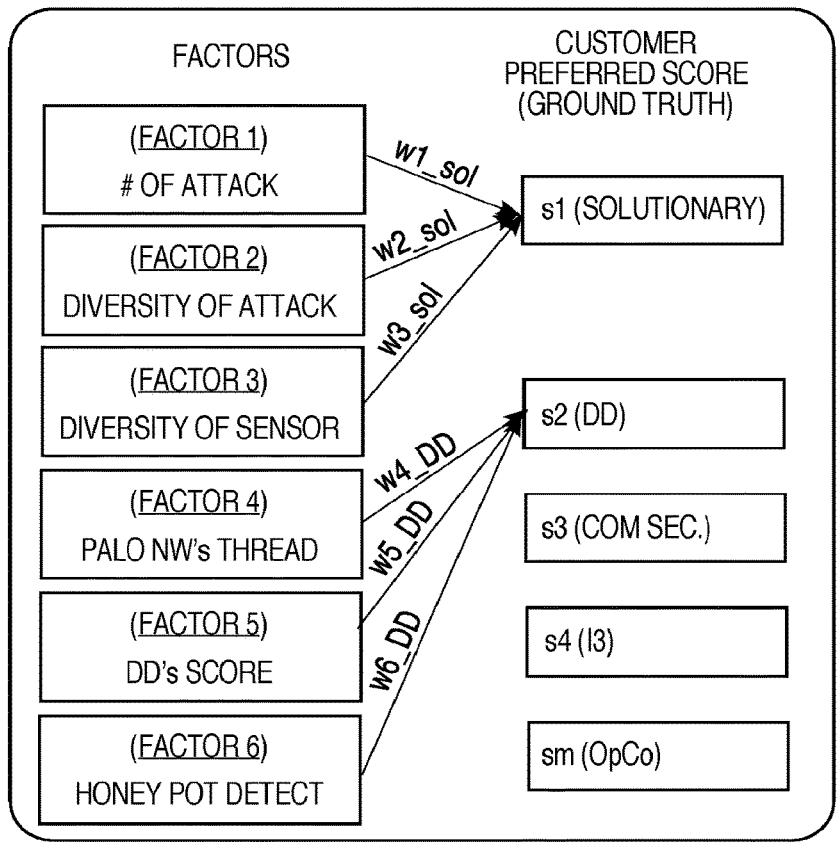
FIG. 7 illustrates further details of the machine learning threat scoring that is part of the threat scoring method.

This computation should be made for all of the complete datasets. Note that not all data points have computable ground truths. For example, if a factor's dimensional data score (DD's score) is NaN (not a number), the ground truth cannot be computed. For example, as shown in FIG. 7, threats 103 and 104 cannot be computed because their DD score is NaN. As shown in FIG. 7, the computed ground truth for the example factors above are shown.

The key point of the processes is that each customer/user of the system can place different emphasis on threat analysis and thus the threat scoring is adjusted based on the different emphasis applied by the users. In the system, the feature extraction uses the original threat data 210A that may have 30-dimensional data point and the factors extracted as described above provide the additional features. These two components are concatenated as a feature.

The purpose of the feature engineering 326 is to convert the raw data into the proper data for machine learning. Categorical information may be one-hot encoded. In the threat data case, the following list should be converted. This transaction expands the feature space from 40 to 180.

```
one_hot_list = ["category", "killChain", "identifiedBy", "releaseLimits",
"destinationCountryCode", "destinationCity", "sensorTYpe",
"dataSource", "timestampReceived_weekday",
"timestampReceived_24hour", "timestampIdentified_weekday",
"timestampIdentified_24hour", "expirationDate_weekday",
"expirationDate_24hour", "modificationtimestamp_weekday",
"modificationtimestamp_24hour"]
```

Figure 8:
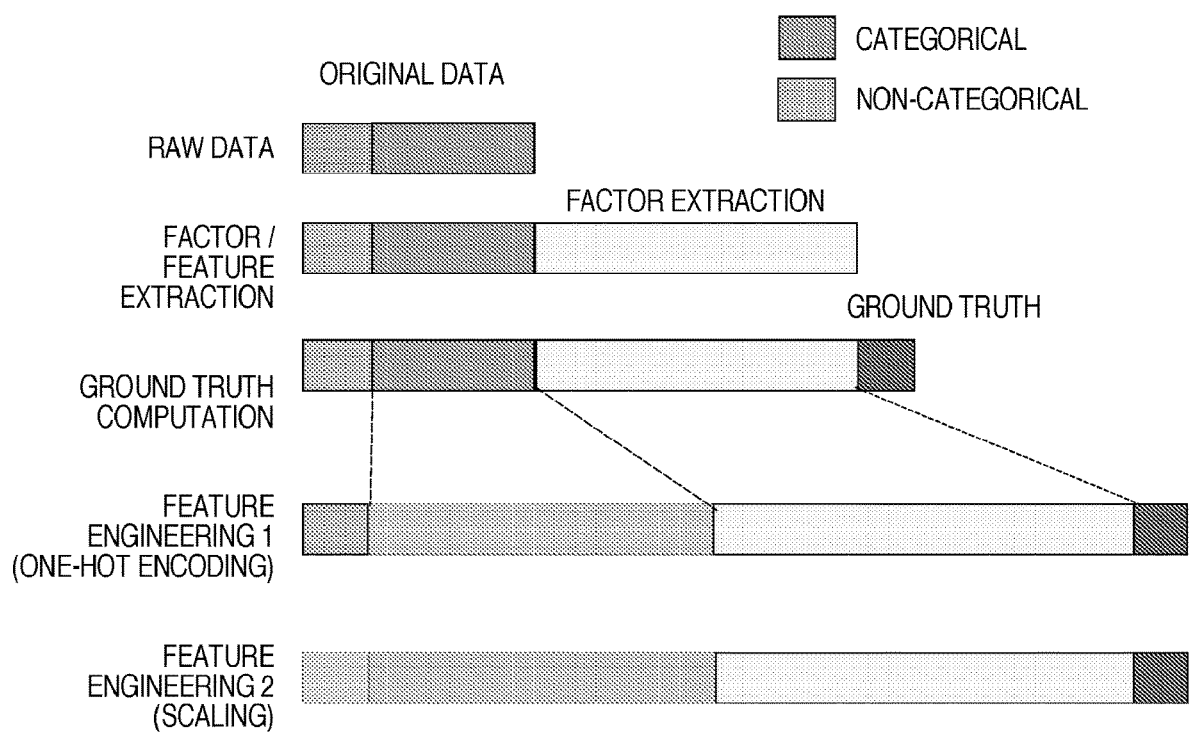
FIG. 8 illustrates an example of the dataset used in the threat scoring method.

Other features may be scaled so that the scores are from 0.0 to 1.0. The finalized dataset for the exemplary data is shown in FIG. 8. The finalized dataset is a combination of the following: Scaled and non-categorical raw data; Categorical and one-hot encoded raw data; Scaled and extracted factors and Computed ground truth (labeled data).

Scoring Threats by Machine Learning and Performance Evaluation Process 306

Figure 9:
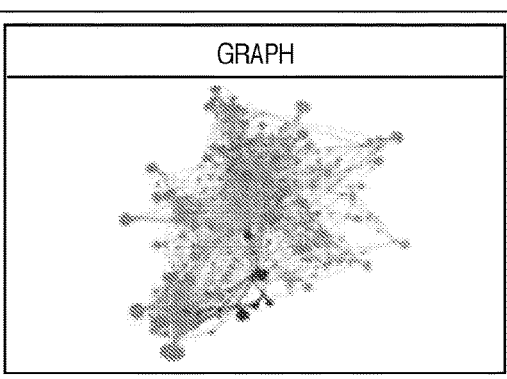
FIG. 9 illustrates an example of a user interface for displaying the results of the threat scoring method.

In this process 306, the system may perform machine learning to score the threats 330 and do performance evaluation 332 and then generate results that may be displayed 334 to the user on the computing device 202. An example of the results for the exemplary data is shown in FIG. 9.

Because of the unique ID problem stated earlier, the prediction model, a regression model, must be remodeled at certain refresh intervals, which keeps the IP addresses updated. The refresh intervals can be determined by taking into account the computational time that is required for data analysis. With regards to regression prediction with machine learning, the data with the computed ground truth is used for machine learning analysis (threats 101 and 102 in FIG. 7), which is then used to score the unlabeled data (threats 103 and 104). After the system builds the model, a feature is only considered if it is complete or complementable.

The regression model can be one of the following models or a combination of them.
Logistic Regression
Deep Learning
Random Forest This regression model must be carefully chosen through trial and error in a real-life production environment to maximize prediction performance. An example of the results of the machine learning is shown in FIG. 9.

Performance Evaluation 332

For evaluation, the system uses the root-mean squared error (RMSE) metric, which is a commonly used metric for regression models. The performance evaluation example is shown in FIG. 9 that is displayed to the user.

The following formula is used for calculating RMSE, where x is the ground truth, x~ is the predicted value, and N is the data size.

$$RMSE = \frac{\sum^{N} \sqrt{((x-x^{\sim})^2)}}{N}$$

For example, the data whose ground truth is 0.80 is predicted as 0.7. In this case, the error is 0.1. Another data whose ground truth is 0.60 is predicted as 0.9. In this case, the error is 0.3. RMSE for these 2 data points is 0.2.

A 10-fold cross validation must be performed only for the complete data.

Even though the power of machine learning is especially shown in the orange box data in the preceding diagram, the prediction performance for these data cannot be computed.

Experimental Result

To assess the performance of the system, the system may use to process a small example dataset. For the dataset, we used 6 hours of live threat data and used a Random Forest regression model with 1,000 seeds. The experiment ran on a MacBook Pro with a 3.1 GHz Intel Core i7 processor and 16 GB of RAM.

The average values of the accuracy results over 10 trials were as follows:
RMSE learning error: 0.039
RMSE test error: 0.041
The computational time results were as follows:
Ground-truth computation: 58 seconds
Learning processing: 3 minute and 30 seconds
Test processing: 14 seconds As shown in FIG. 9, the user interface may display a table with the machine learning data and the table lists the threat information. For each listed threat, the table displays the ground truth score and the prediction score. The user may use the table to validate the scores. The user interface also displays the RMSE reliability metrics for the analyzed threat scores. The user interface may also show a graph that is a visualization of the results in the form of a network graph that can be used for further analysis. In addition to displaying the results, the user interface shown in FIG. 9 may also be used by the user to download: 1) the scoring results in a comma-separated format' 2) the network graph visualization of the scoring results; and/or 3) the original data that was used in the analysis.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A threat scoring system, comprising:
a threat scoring computer system having a processor, memory and a plurality of lines of instructions configured to:
select a plurality of threat factors, each threat factor being data about a cyber-threat attack, by generating a user interface with a list of threat factors, and selecting, by a user, the plurality of threat factors from the list of threat factors, the list of threat factors including a number of attacks, a diversity of sensors, and a honey pot detection;
assign a user defined weight to each selected threat factor to generate a plurality of weighted threat factors, wherein the user defined weight for each particular threat factor is determined by specifying an importance of the particular threat factor relative to another threat factor and by computing a reciprocal matrix containing the user defined weights of the selected threat factors;
generate a normalized weight from the plurality of weighted threat factors and generate a ground truth score for each of the plurality of weighted threat factors; and
determine a threat score using machine learning on the plurality of weighted threat factors.

2. The system of claim 1, wherein the threat scoring computer system is further configured to scale each of the selected plurality of threat factors so that each threat factor has a score between 0 and 1.

3. The system of claim 1, wherein the threat scoring computer system is further configured to use a regression model using the ground truth scores.

4. The system of claim 3, wherein the threat scoring computer system is further configured to use one of logistic regression, deep learning and random forest.

5. The system of claim 4, wherein the threat scoring computer system is further configured to generate a performance evaluation for the threat score.

6. The system of claim 5, wherein the threat scoring computer system is further configured to determine a root mean squared error.

7. A threat scoring method, comprising:
selecting a plurality of threat factors, each threat factor being data about a cyber-threat attack, by generating a user interface with a list of threat factors and selecting, by a user, the plurality of threat factors from the list of threat factors, the list of threat factors including a number of attacks, a diversity of sensors, and a honey pot detection;
assigning a user defined weight to each selected threat factor to generate a plurality of weighted threat factors, wherein the user defined weight for each particular threat factor is determined by specifying an importance of the particular threat factor relative to another threat factor, wherein assigning the user defined weight to each selected threat factor further comprises computing a reciprocal matrix containing the user defined weights for each threat factor and generating a normalized weight from the plurality of weighted threat factors and generating a ground truth score for each of the plurality of weighted threat factors; and
determining a threat score using machine learning on the plurality of weighted threat factors.

8. The method of claim 7, wherein selecting the plurality of threat factors further comprises scaling each of the selected plurality of threat factors so that each threat factor has a score between 0 and 1.

9. The method of claim 7, wherein determining the threat score using machine learning further comprises using a regression model using the ground truth scores.

10. The method of claim 9, wherein using a regression model further comprises using one of logistic regression, deep learning and random forest.

11. The method of claim 10 further comprising generating a performance evaluation for the threat score.

12. The method of claim 11, wherein generating the performance evaluation further comprises determining a root mean squared error.

* * * * *